(12) United States Patent
Balasubramanian

(10) Patent No.: US 6,201,630 B1
(45) Date of Patent: *Mar. 13, 2001

(54) ELECTRO-OPTIC APODIZATION HAVING BACKWARD COMPATIBILITY AND DISCRIMINATION CAPABILITIES FOR OPTICAL DISK DRIVES

(75) Inventor: Kunjithapatham Balasubramanian, Orlando, FL (US)

(73) Assignee: Discovision Associates, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,342

(22) Filed: Jan. 9, 1998

(51) Int. Cl.[7] .................................................. G02F 1/03
(52) U.S. Cl. ..................... 359/245; 359/258; 359/558; 359/559; 359/305; 369/112; 369/44.24
(58) Field of Search ................................. 359/238, 245, 359/249, 258, 280, 281, 305, 310, 315, 558, 559, 565; 369/100, 112, 116, 44.23, 44.24, 106

(56) References Cited

U.S. PATENT DOCUMENTS

| | | | |
|---|---|---|---|
| 5,386,105 | * 1/1995 | Quinn et al. | 359/558 |
| 5,539,568 | * 7/1996 | Lin et al. | 359/245 |
| 5,644,420 | * 7/1997 | Nakane | 359/245 |
| 5,682,262 | * 10/1997 | Wefers et al. | 359/305 |
| 5,719,704 | * 2/1998 | Shiraishi et al. | 359/558 |

OTHER PUBLICATIONS

Alan B. Marchant, "Optical Recording", pp. 89–91, Addison–Wesley Publishing Company (1990).

Edwin P. Walker and Tom D. Milster, High–frequency enhancement of magneto–optic data storage signals by optical and electronic filtering (Optical letters), vol. 20, No. 17 (Sep. 1, 1995), pp. 1815–1817.

Hisanobu Dobashi, Takaya Tanabe and Manabu Yamamoto, Crostalk–Suppressed Read–out System Using Shading Band (Journal of Applied Physics), vol. 36 (Jan. 1997), pp. 450–455.

* cited by examiner

Primary Examiner—Loha Ben
(74) Attorney, Agent, or Firm—Keiji Masaki; Donald Wenskay; Richard Stokey

(57) ABSTRACT

The present invention preferably includes a shading band which is suitably electro-optically created in a grid pattern formed through a photolithographic process, so consequently, the electro optic shading band is easily eliminated or re-configured dynamically to substantially eliminate its shading effect for lower density optical disks which do not experience substantial adjacent track crosstalk (ATC). Eliminating or reconfiguring the shading effect also helps in accommodating different media types and generations and those of different manufacturers. Moreover, the electro-optic shading band suitably adjusts the amplitude, phase, frequency, polarization and/or the like of the light beam to compensate for possible material property variations, defects, misalignments or other imperfections in the reading process. The present electro-optic shading band substantially restricts or alters any portion of a light beam containing signal information read from an optical disk. In a preferred embodiment, the electro-optic shading band reduces undesired portion of the low frequency distribution in the diffraction pattern of the readout beam which results from reading marks in high density optical disks, thereby enhancing the signal relative to the noise and crosstalk in high performance optical disk drives.

32 Claims, 4 Drawing Sheets

ELECTRO-OPTIC APODIZATION HAVING BACKWARD COMPATIBILITY AND DISCRIMINATION CAPABILITIES FOR OPTICAL DISK DRIVES

FIELD OF THE INVENTION

The present invention is related to, generally, a configurable masking device for an optical media reader, and more particularly, to an electro-optical apodization/masking device which allows backward compatibility to prior generations of optical media and provides phase, amplitude, polarization and frequency discrimination.

BACKGROUND OF THE INVENTION

As a result of, inter alia, the increased use of multimedia computers, the demand for higher density storage in optical media is increasing. The capacity of optical media (i.e., optical disk and/or the like), which is typically based on the density of the information on the optical media, has substantially increased in recent years and exponential growth in the capacity of optical media is expected in the next few years. As an example of the density increase, the currently marketed 4X generation of magneto-optical media commonly has a capacity of about 2.6 GB and the 8X generation currently being developed would have a capacity of about 5.2 GB. The following discussion is generally related to magneto-optical disk systems; however, the basic concepts relating to read out signal and crosstalk etc. are generally applicable to other types of optical disk systems, though specific reading, erasing and recording mechanisms may be different.

When increasing the capacity of an optical disk, the separation of the spiral tracks (each track is commonly comprised of a groove between two lands) typically formed on the surface of the optical disk is substantially reduced such that the individual track/land are typically less than 1 $\mu$m apart from each other. Numerous marks (also known as domains), the sizes of which are typically determined by the writing laser spot size (a "spot" is a common term for the focused laser beam often limited by diffraction) and the length of a binary representation of a data field, are commonly recorded in the grooves between the track lands (see FIG. 3). These marks may also be written on the lands or on both land and groove. Due to the decreased distance between adjacent tracks on the high density optical disk, the formation and detection of a mark in a groove between two adjacent track lands often becomes increasingly difficult. Similar difficulty typically exists for writing/reading marks on the lands.

To fit within a track, a sufficiently small optical beam spot is typically required. Laser wavelength and the numerical aperture of the lens used for the writing device typically determine the beam spot size, and consequently, the size of each mark. Shorter wavelength and higher numerical aperture provide smaller spot size and smaller marks result in increased storage density. Thus, a high power semiconductor red laser (typical wavelength 685 nm) is often utilized when writing the magnetic code onto the optical disk. However, typically lasers with wavelengths between 650 and 685 nm are currently utilized by the optical disk storage industry, though laboratory prototypes of shorter wavelength lasers are emerging. Moreover, the numerical aperture is mathematically restricted to be less than 1.0 in common implementations. Thus, a further substantial reduction in the size of the optical beam spot by a shorter wavelength or larger numerical aperture currently presents practical problems.

Because of the limitations in reducing the size of the focused optical beam, the beam spot size is often larger than the width of a single track in a high density optical disk and, often the laser energy extends over into the adjacent track, thereby resulting in a problem known as adjacent track crosstalk (ATC). ATC becomes a more pronounced problem when writing low frequency data onto a high-density optical disk (i.e., 8X generation and denser) because the low frequency data typically forms a larger mark contributing to more signal and more crosstalk. Because the beam spot is often larger than an individual track in a high density disk and often extends into the adjacent track, the data contained within the larger mark in the adjacent track is partially read when the reading process occurs on the main track, thereby resulting in crosstalk from the adjacent tracks (see FIG. 3).

Specifically, when reading from a disk, the laser beam commonly analyzes each mark within the track. When ATC exists, the data contained within the large masks in neighboring tracks is partially sensed by the read focused spot when the reading process occurs on the adjacent track. The amount of crosstalk that is coupled to the read focus spot is typically proportional to the size of the mark and spacing between marks. For example, and as shown in FIG. 3, when reading a 2T pattern, which is the smaller mark size pattern, the read focused spot may sense an 8T pattern (large marks) located in an adjacent track. If the amount of the adjacent track signal pattern which is sensed by the read focused spot is greater than about 10% of the 2T pattern signal amplitude, excessive jitter typically occurs, thereby decreasing the reliability in the read channel.

During a typical reading process from a magneto-optical disk, the laser beam, after having its polarization state altered by the magnetic material of an individual mark on the optical disk, is usually analyzed by a detector and associated electronic circuits. The intensity distribution across the focused spot usually follows what is called the Airy pattern. Upon reflection from the disk, the high frequency small mark pattern typically diffracts light toward the side perimeter of the collecting optics aperture, while the low frequency large mark pattern diffracts light towards the center of the aperture (see FIG. 4). Noise, however, is often distributed randomly throughout the readout aperture.

A known method for substantially reducing ATC is to selectively suppress the low frequency content from the adjacent track in the readout beam while enhancing the high frequency response because, as discussed, the low frequency large mark pattern from the adjacent tracks give unwanted overlap and the high frequency pattern emanates from the high frequency marks which generate substantially less ATC. To selectively reduce the low frequency content from the adjacent track, a technique known as "apodization" is employed whereby a narrow shading band is placed in front of the detector or the readout beam path. The shading band, because of its carefully selected central location, often substantially blocks out the crosstalk section of the beam in the readout path. Moreover, by selectively blocking out the unwanted portion of the beam in the readout aperture, a large portion of the noise contained within that section of the spot is also blocked out, thereby increasing the signal to noise ratio. Consequently, this technique can provide up to about 10 dB improvement of ATC. The shading band often comprises a thin rectangular strip of any suitable material or a metal wire of chosen diameter, typically covering about 20 to 30% of the beam size. The aforementioned apodization technique is described in more detail in "High-frequency enhancement of magneto-optic data storage signals by optical and electronic filtering" by Edwin P. Walker and Tom D.

Milster, *Optics Letters*, Volume 20, No. 17 (Sep. 1, 1995), pp. 1815–1817, "Crosstalk reduced by new types of optical filtering" by Takeshi Shimano, et al., presented at the 1997 Optical Data Storage Topical Meeting on Apr. 7–9, 1997 and "Crosstalk-Suppressed Read-out System Using Shading Band" by Hisanobu Dobashi, Takaya Tanabe and Manabu Yamamoto, *Journal of Applied Physics*, Volume 36 (January 1997), pp. 450–455, which are herein incorporated by reference.

Apodization is typically a powerful method for selectively suppressing the low frequency portion of the diffraction pattern and thereby decreasing the ATC when reading high density optical disks. However, an optical disk reader which is constructed with a shading band in front of the detector or in the readout optical path is typically only optimally effective when reading optical disks of sufficiently high density (i.e., 8X generation and denser) which display ATC problems. In other words, the optical disk drives with such apodization device for the 8X generation optical disks are typically not effectively backward compatible for the prior generation lower density disks which commonly do not experience substantial ATC. Therefore, when an earlier generation, lower capacity, optical disk is inserted into a high density optical disk drive, the shading band, which is a permanent part of the high density optical disk drive and limited to a permanent configuration, will often still substantially reduce or eliminate signal content in the diffraction pattern in the masked portion of the readout beam even though the masked portion does not necessarily comprise the unwanted ATC. Thus, when a lower density, earlier generation, optical disk is inserted into an optical disk drive which is configured with a shading band, a significant reduction in valuable signal information can occur without any substantial benefit.

SUMMARY OF THE INVENTION

The present invention preferably includes an electro-optical shading band of any configuration, preferably comprised of an electro-optic medium such as liquid crystal medium, which when suitably configured and activated substantially restricts any portion of a light beam containing signal information read from an optical disk. In a preferred embodiment, the electro-optic shading band can selectively attenuate portions of the optical beam which results from reading marks in optical disks. Such a device can enhance the signal to noise ratio and suppress the crosstalk arising from adjacent tracks in high performance optical disk drives. Because the optical system transfer function is modified, thereby providing better high frequency response, the enhanced signal improves the total system performance.

The shading band is suitably electro-optically generated for example in a medium whose optical properties are modified in a grid pattern which can be formed by photolithographic processes. The dynamic control of the shading band pattern provides feasibility to dynamically reconfigure or eliminate the shading when necessary thereby affording compatibility with lower density optical disks. The electro-optic shading band is preferably implemented in the pupil plane, and alternatively, is used in a chosen location in the optical path to selectively filter low or high frequencies in the cross-section of the beam. Moreover, the electro-optic shading band suitably adjusts the amplitude, phase, polarization and/or the like of the light beam when necessary to compensate for possible defects, misalignments or other imperfections in the optical reading process.

BRIEF DESCRIPTION OF THE DRAWING FIGURES

The subject invention will be hereinafter described in conjunction with the appended drawing figures, wherein like numerals denote like elements, and:

DETAILED DESCRIPTION OF PREFERRED EXEMPLARY EMBODIMENTS

Figure 1:
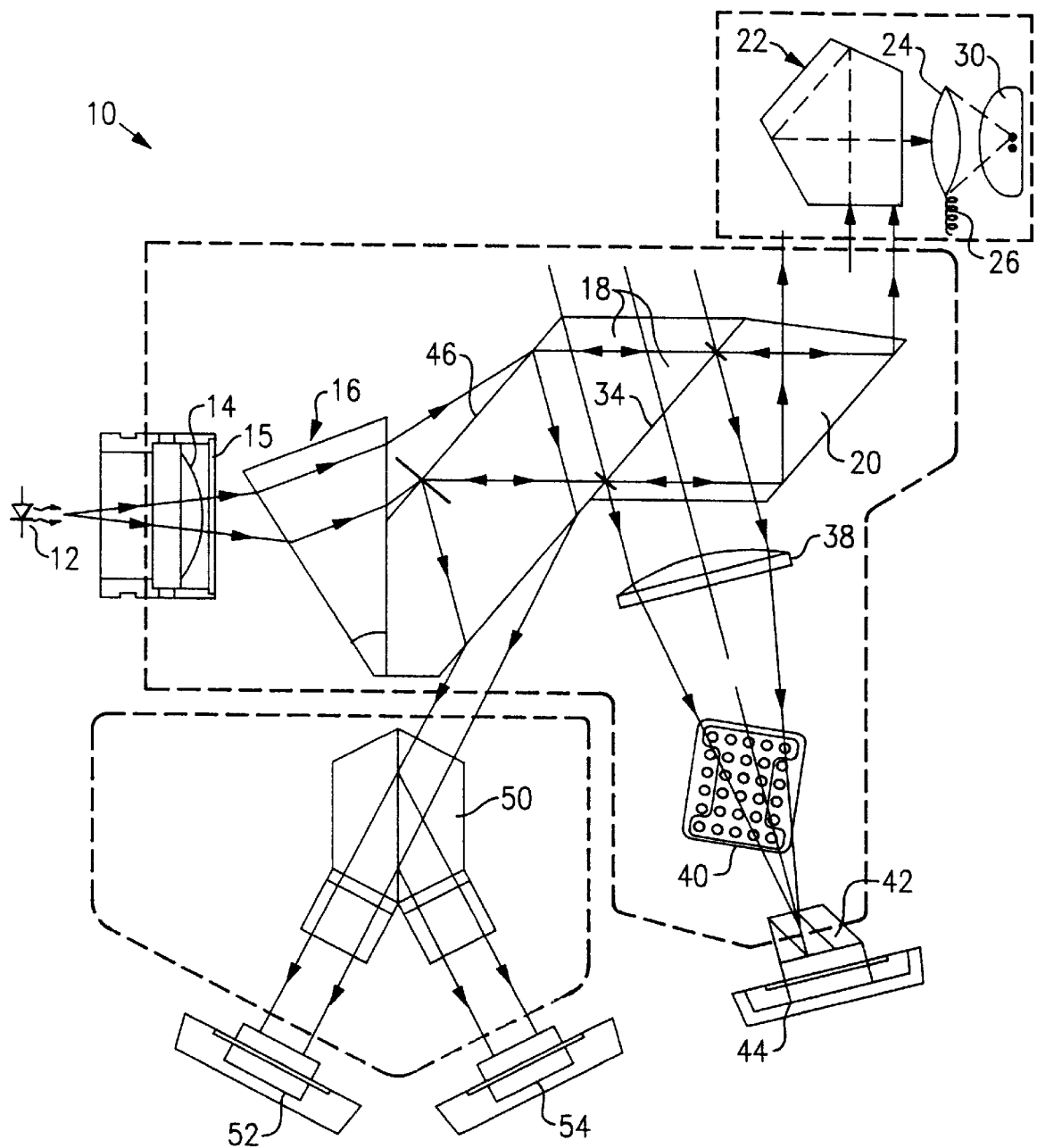
FIG. 1 shows a schematic representation of preferred optical components of the optical disk reader in accordance with a preferred embodiment of the present invention.

The present invention suitably enhances readout performance by suppressing noise and crosstalk, in high performance optical disk drives by selectively suppressing unwanted portion of low frequency content 84 (see FIG. 4) in the read out of marks 75 written on high density optical disks 30. In a preferred embodiment, the present invention makes such high performance optical drive also backward compatible to prior generation, lower density, optical disks without substantially reducing useful signal. The present invention is also capable of suitably adjusting the amplitude, phase, frequency, polarization and/or the like content of the light beam to compensate for possible misalignments or other effects due to imperfections in the reading process. The following discussion is generally related to magneto-optical disk systems: however, the basic concepts relating to read out signal and crosstalk etc. are generally applicable to other types of optical disk systems, though specific reading, erasing and recording mechanisms may be different. Furthermore, one of ordinary skill in the art will appreciate that the present invention, while described in relation to magneto-optics, also applies to any optical disk system based on other techniques such as phase change techniques including, for example, DVD technology.

The present invention, in general, preferably includes an electro-optic shading band device 40 of any configuration which substantially reduces the unwanted portion of the low frequency content of the diffraction pattern within the aperture of the readout path 80. Because the optical transfer function is modified, thereby providing better high frequency response, the enhanced signal improves the total system response. In a preferred embodiment, shading band 60 is suitably electro-optically created through a pattern formed by photolithographic process, so consequently, the photolithographically generated shading band is easily eliminated or re-configured by electronic means to substantially alter or eliminate its shading effect for optical disks which do not experience substantial adjacent track crosstalk (ATC). Electro-optic shading band device 40 is preferably implemented in the pupil plane, or in the optical path and alternatively, is used in the Fourier plane to selectively filter low or high frequencies or selected portions of their distribution.

As shown in FIG. 1, a preferred embodiment of optical system layout of an optical disk reader 10 generally includes a laser 12, various optical components 14, 16, 18, 20, 22, 24, 34, 38, 42, 46 and 50, and optical disk 30, shading band device 40, and detectors 42, 52 and 54. While a preferred embodiment of the specific components and arrangement of the components will be described below, it will be appreciated by one of ordinary skill in the art that alternative components and alternative arrangements of the components can be configured to achieve a similar system which enhances the signal and suppresses the noise and crosstalk in high performance optical disk drive 10 while suitably electro-optically substantially reducing filtering when reading prior generation optical disks with lower density.

With respect to FIG. 1, a schematic representation of a preferred embodiment of the present optical disk reader is shown. Reading laser 12 is any suitable light source capable of reading marks 75 on an optical media but preferably is an appropriate wavelength semiconductor laser. In a preferred embodiment, reading laser 12 is about an 685 nm semicondutor laser. The divergent light emanating from laser 12 is preferably collimated by collimator 14 and then suitably plane polarized by polarizer 15 if necessary. The light then preferably travels through prisms/plate assembly 16, 18 and 20 and is subsequently suitably reflected into penta prism 22. Prisms 16, 18 and 20 are suitably connected together but any prism arrangement or other suitable reflecting device can alternatively be used to transfer the light beams into penta prism 22 or other suitable optical component which can direct the light beam on the disk. Penta prism 22 preferably transfers the light to a plane above the plane of prisms 16, 18 and 20 then preferably reflects the light into objective lens 24. Objective lens 24 suitably focuses the light onto optical disk 30 while resting upon actuator 26. As is known by one of ordinary skill in the art, actuator 26 preferably receives focus and tracking feedback from detectors 52, 54 wherein the feedback is analyzed by actuator 26 such that actuator 26 suitably adjusts objective lens 24 thereby providing optimum focusing and tracking of the light beam onto optical disk 30 by any known method.

Figure 3:
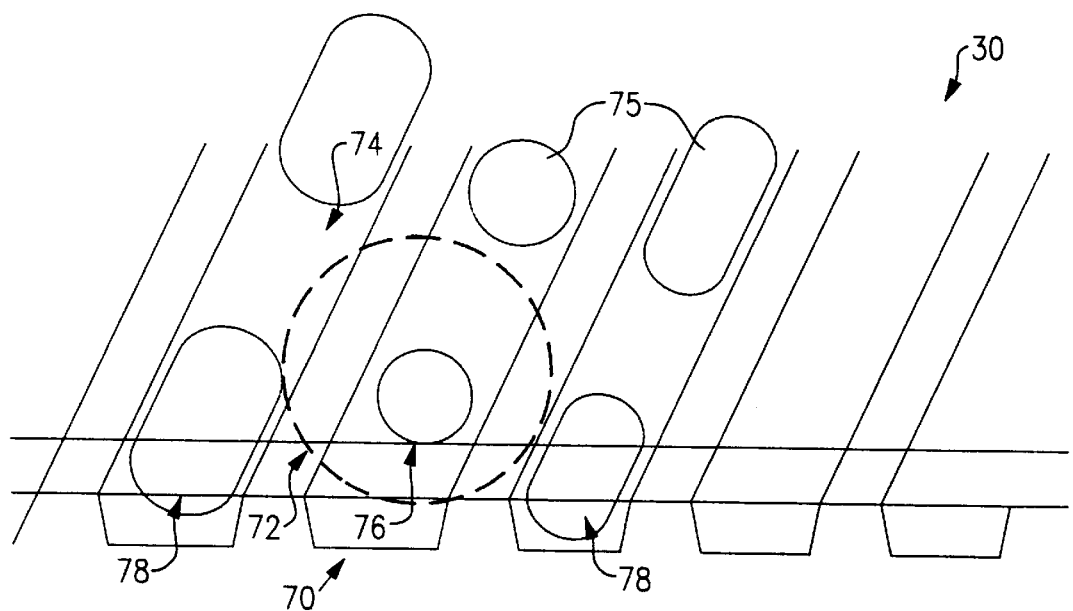
FIG. 3 shows a schematic magnified view of adjacent tracks on an optical disk containing marks with one mark showing the possibility of adjacent track crosstalk in accordance with a preferred embodiment of the present invention.

While the present invention is described with reference to reading information from optical disk 30, optical disk 30 alternatively is any suitable optical media. With respect to FIG. 3, in a preferred embodiment, optical disk 30 includes marks 75 within tracks 70, whereby tracks 70 are comprised of lines (also called lands) 72 and grooves 74 between lands 72. Marks 75 preferably include high frequency smaller marks 76 and low frequency larger marks 78. FIG. 3 shows an example of the possibility of a focused laser beam interacting with a mark on an adjacent track generating an unwanted signal from the adjacent track. This unwanted crosstalk signal is typically more pronounced for larger size low frequency marks than for smaller size high frequency marks.

With continued reference to FIG. 1, after the plane polarized light beam contacts the magnetic material (in the case of magneto optical disk) contained within optical disk 30, the state of the light polarization is altered by the magnetic material, and consequently, the light reflects from optical disk 30 in generally an elliptically polarized state with its major axis rotated due to the known Kerr effect. The elliptically polarized light next preferably re-enters penta prism 22 and is sent back down to the original plane of travel and preferably redirected back into prism 20. Partial reflector 34 preferably reflects the beams toward reading lens 38 which, in turn, preferably focuses the beam toward differential detector 44. After exiting reading lens 38, and as more fully described below, the beams preferably travel around, or are substantially blocked by, shading band device 40 such that the undesired portions of the low frequency content of the light beam is suitably suppressed, thereby enhancing the system performance in the read out of the marks 75 written in optical disk 30. In another alternative embodiment, shading band device 40 is set in any location along the beam path such that the undesired portions of the low frequency content of the light beam is suitably suppressed, thereby enhancing the system performance in the read out of the marks 75 written in optical disk 30. The parts of the beam that are not blocked by shading band device 40 preferably enter microprism beam splitter 42 which suitably splits the beam into two polarization states. The beam containing the two polarization states then preferably enters differential detector 44 which suitably analyzes the signal data within the beam.

As mentioned, when the elliptical polarized light reenters penta prism 22 and is sent back down to the original plane of travel, the light beam is preferably reflected toward reading lens 38 by partial reflector 34. However, a portion of the light beams preferably travel through partial reflector 34, and are preferably reflected toward feedback detectors 52, 54 by reflector 46. After the beams are reflected by partial reflector 46, the beams preferably travel through prism 18 and are preferably directed toward FTR prism 50 which, inter alia, splits the beam into two different beam paths such that one beam preferably contacts feedback detector 52 and the second beam preferably contacts feedback detector 54. Detectors 52, 54 are any suitable feedback detectors which together provide optimal feedback to actuator 26 thereby suitably focusing lens 24 to the substantially optimal location on optical disk 30. The focusing and tracking functions of detectors 52 and 54 are performed by any well known focusing and tracking mechanisms.

Figure 2A:
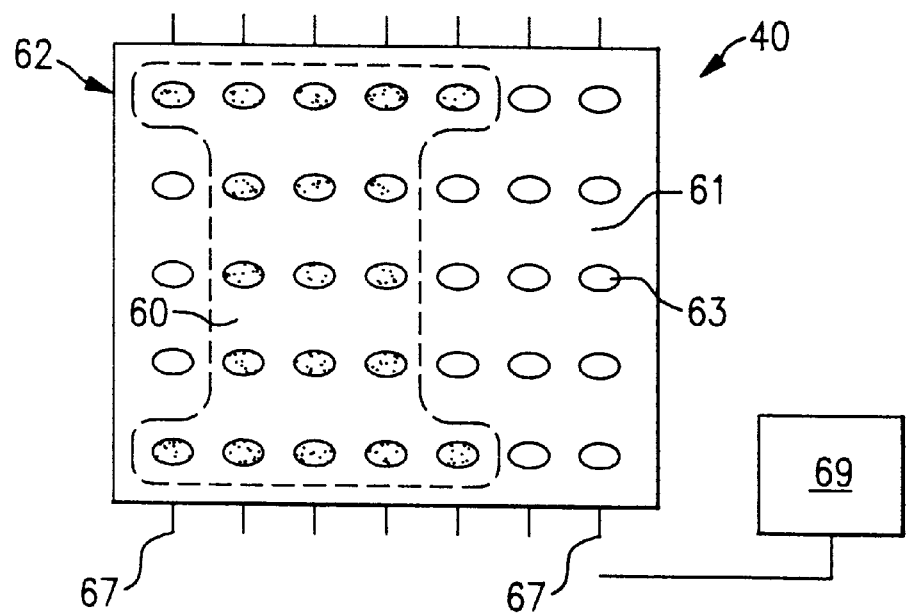
FIG. 2A shows a front view of an exemplary electro-optic shading band in accordance with a preferred embodiment of the present invention.

With respect to FIG. 2A, an exemplary electro-optic shading band device 40 in accordance with a preferred embodiment of the present invention is shown. Shading band device 40 is any device comprised of any material in any shape which is capable of selectively suppressing parts of low frequency content and enhancing high frequency response by substantially blocking out the low frequency content, particularly including that arising from adjacent tracks in the disk, of a light beam. For example, the overall shape of shading band device 40 may be rectangular, square or circular. In a preferred embodiment, shading band device 40 suitably creates an electro-optic shading band 60 of any configuration which substantially restricts any portion of a light beam containing signal information read from an optical disk. The electro-optic shading band 60 is implemented in the read beam path or in the pupil plane, and alternatively, is used in the Fourier plane to selectively filter low or high frequencies.

Figure 2B:
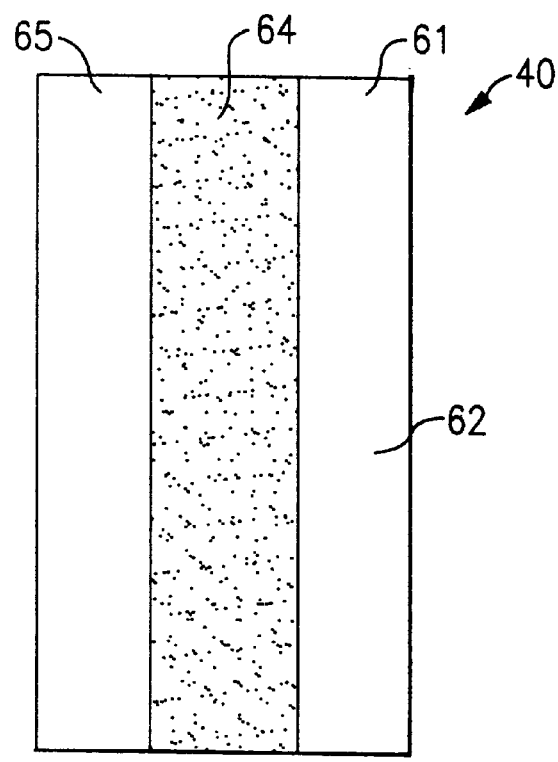
FIG. 2B shows a side view of an exemplary electro-optic shading band in accordance with a preferred embodiment of the present invention.

In a preferred embodiment, shading band 60 is suitably electro-optically created by shading band device 40 through a photolithographic process. Shading band device 40 is any shape or configuration, but is preferably about a 5 mm×5 mm×2 mm rectangular block. For example, in an alternative embodiment, shading band 60 may also be of circular shape. One skilled in the art will appreciate that these dimensions may vary depending on laser beam size, physical layout of the optics assembly, various apertures in the system, and the physical location of the shading band device. With reference to FIGS. 2A and 2B, shading band device 40 preferably includes a front face 61, a back face 65, a medium 64 between faces 61 and 65, transparent conductive coatings 63 positioned on faces 61 and 65, leads 67 emanating from transparent conductive coatings 63 and a processor 69 in communication with leads 67. Faces 61, 65 are any suitable surface capable of holding transparent conductive coatings 63 and faces 61,65 are preferably prepared by well known vacuum deposition processes for such coatings. Medium 64 is any suitable medium capable of responding to a potential difference thereby producing the desired transparency in pattern of shading band 60 such as a crystal, liquid crystal, E-O medium, A-O medium and/or the like. In a preferred embodiment, medium 64 is a liquid crystal medium.

Conductive coating 63 is any conductive coating capable of forming a potential difference adjacent to medium 64 such as electrodes, electrical line leads, circular dots, annular rings, donut-shaped patterns and/or the like. Coatings 63 is located on front face 61 and/or back face 65. In a preferred embodiment, coating 63 is a grid of circular electrodes equally spaced across front face 61 and configured such that coating 63 is substantially transparent (about 90% transparent and as large as possible) when conductors are in the off mode. In an alternative embodiment, coating 63 is a rectangular grid formed by selecting a pair of electrodes on either side of the electro-optic (liquid crystal) medium. Thus, an electric field is suitably generated at the cross hair point thereby turning the liquid crystal at that point on or off to create transparency or shade. Although conductive coating 63 is not fully transparent, conductive coating 63 only attenuates the beam about 10% when in the off mode, compared to about 100% attenuation of a typical permanent shading band. Thus, upon activation of any electrodes 63, shading band 60 consisting of liquid crystal medium 64 of any configuration is suitably formed allowing shading band 60 to substantially restrict unwanted part of the low frequency content in the diffraction pattern 84. Front face 61 of shading band 60 is preferably comprised of medium 64 configured by conductive coating 63 in a substantially "bowtie" shaped pattern or any other desired pattern.

Figure 4A:
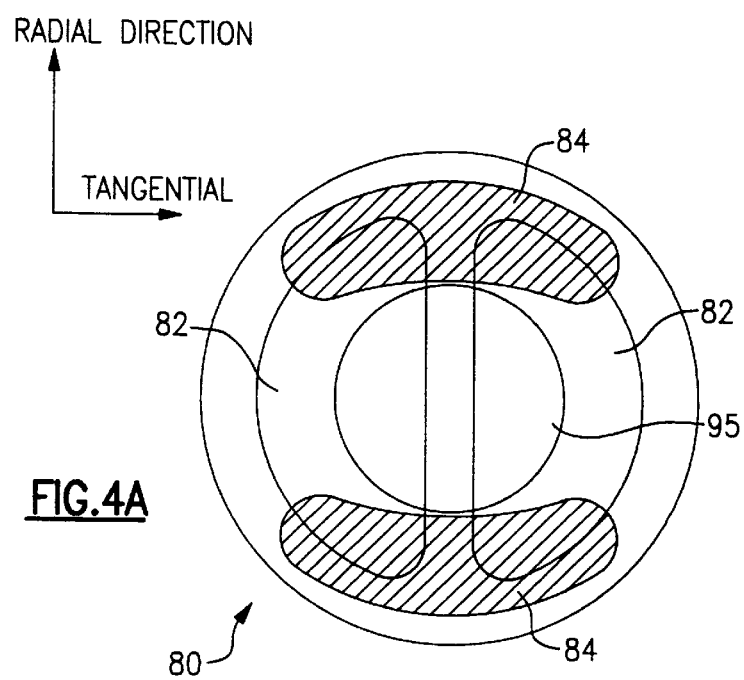
FIG. 4A shows a schematic profile of a typical signal distribution in a read out beam within a spot.
Figure 4B:
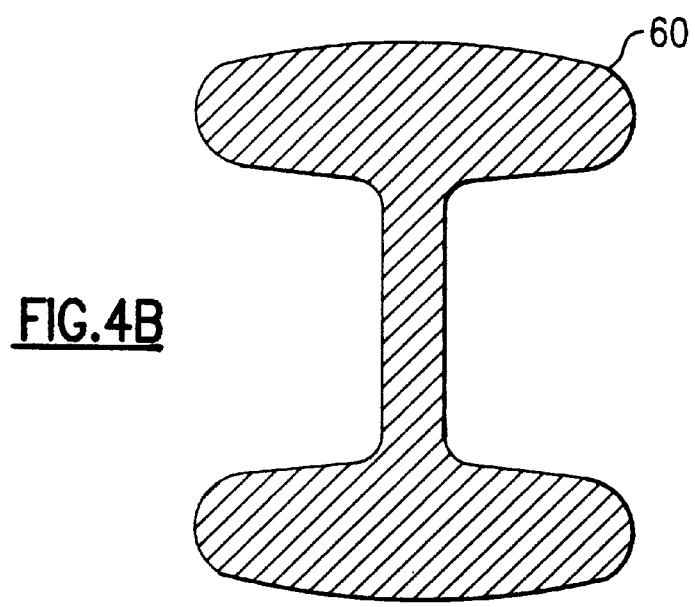
FIG. 4B shows an exemplary configuration of a shading band to mask off undesired crosstalk signal in the read out beam; and, FIG. 5 shows another exemplary configuration of a mask to reduce crosstalk and noise in the readout signal.
Figure 5:
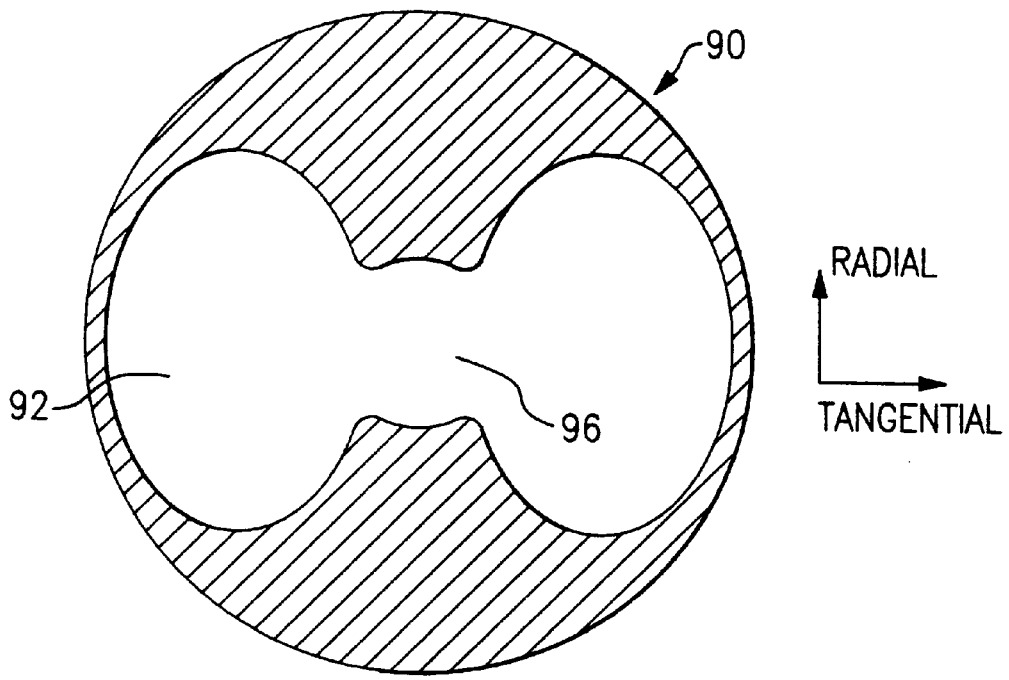

FIG. 4A shows a schematic profile of a typical signal distribution in a readout beam reflected from an optical disk 30. In FIGS. 4A, 4B and 5 (discussed below), tangential direction refers to direction parallel to tracks 70 and radial direction refers to direction perpendicular to tracks 70, i.e. along the radius of disk 30. With momentary reference to FIG. 4A, low frequency signal 84 of spot 80 comprises predominantly undesired 8T signal from an adjacent track (ATC). Undesired signal 84 extends towards the top and bottom regions of spot 80. Desired 2T signal 82 from the center track includes the high frequency diffraction pattern and is substantially located on the two sides of spot 80 close to the perimeter of the readout path aperture. Desired 8T signal 85 from the center track is substantially located within the center region of spot 80. In other words, the undesired signal from adjacent tracks appears more in the top and bottom regions of the beam. This observation has been experimentally observed and documented by the inventor in a laboratory environment.

FIG. 4B shows an exemplary configuration of shading band 60. With respect to FIG. 4B, the advantages of the substantially "bowtie" shaped pattern of shading band 60 are evident in that shading band 60 suitably blocks out a substantial amount of the undesired part of the low frequency content in the 8T signal 84 in the beam without blocking a significant amount of desired signals 82, 85.

FIG. 5 shows an alternative mask shape 90 for masking out the predominantly undesired portion (crosstalk) of the signal in the readout beam. Mask shape 90 represents a substantially inversed bowtie shape with the open area 92 within mask shape 90 forming a substantially "bowtie" configuration. Because of the increased open area in the central portion 96 of mask shape 90, additional useful signal is allowed through the mask. The shape can also be dynamically configured through the electrooptic technique of the present invention, namely electro-optic shading band device 40 in FIG. 2A. Mask shape 90 of FIG. 5 blocks out the undesired portions of the signal more accurately and permits the central region to pass through to the detector. The inventor's experimental investigations have shown ATC improvement of about 10 dB with such a mask shape formed of a metal.

In a preferred embodiment, shading band device 40, via leads 67, is in suitable communication with a processor 69 whereby processor 69 is configured to determine the optimal location or placement of shading band 60. The optimal formation of shading band 60 is preferably at a location which intersects the maximum amount of undesired part of the signal distribution in the pattern 84 in spot 80. In a preferred embodiment, processor 69 suitably analyzes the amount of ATC to determine if shading band 60 is in the proper location. In other words, if a large amount of ATC exists in optical disk reader 10, processor 69 preferably adjusts shading band 60 in the X, Y, or Z axis to find the optimal X, Y, Z location for forming shading band 60 such that shading band 60 blocks out the maximum amount of undesired part of the signal in the diffraction pattern 84.

Furthermore, upon deactivation of electrodes 63, shading band device 40 only minimally restricts the signal in the light beam, thereby allowing for backward compatibility to prior generation, low density, optical disks. Moreover, eliminating or reconfiguring the shading effect also helps in accommodating different media types and generations and those of different manufactures. Processor 69 suitably analyzes the optical media 30 inserted into optical disk reader 10 to determine the density of optical disk 30. If processor 69 determines that the density of optical disk 30 is not of a generation which exhibits substantial ATC problems, processor 69 suitably communicates with shading band device 40 to preferably terminate or modify the potential difference across electrodes 63 such that the medium 64 does not form any shading band 60 configuration or alters the configuration so that light is not substantially restricted. In this way, shading band 60 generated electrooptically is easily eliminated or re-configured to substantially eliminate its shading effect for lower density optical disks or other types of disks which may not experience substantial adjacent track crosstalk (ATC) problems.

Moreover, the electro-optic shading band device 40, similar to any known spatial light modulator, suitably adjust the amplitude, phase, frequency, polarization and/or the like of the light beam to compensate for possible misalignments or other imperfections in the reading process.

While the present invention has been described in conjunction with preferred and alternate embodiments set forth in the drawing figures and the specification, it will be appreciated that the invention is not so limited. For example, other sizes, shapes, materials and shading band devices can be incorporated into the exemplary apodization device. Various modifications in the selection and arrangement of components and materials may be made without departing from the spirit and scope of the invention as set forth in the appended claims.

I claim:

1. An apparatus, comprising:
    an electro-optic shading band device of substantially any configuration which substantially restricts a specific portion of a light beam by forming a shading band to substantially modify the frequencies of a selected portion of said light beam; and a processor configured to calculate characteristics of an optical medium and to adjust said shading band of said electro-optic shading band device in response to said calculated characteristics.

2. The apparatus of claim 1, wherein:
said electro-optic shading band device comprises conductive coatings with a medium between said conductive coatings, said conductive coatings comprised of at least one of electrodes, electrical lead strips, circular dots, annular rings and donut-shaped patterns, said medium comprised of at least one of liquid crystal, crystal, electrooptic medium and optically active medium.

3. The apparatus of claim 1, wherein:
said shading band device is configured to form an electro-optic shading band in at least one of a substantially "bowtie" shaped configuration and a substantially inverse "bowtie" configuration to selectively restrict a portion of signal distribution in a diffraction pattern of said light beam.

4. The apparatus of claim 1, wherein:
said electro-optic shading band device is configured to modify at least one of amplitude, phase, frequency and polarization of said light beam.

5. The apparatus of claim 1, wherein:
said electro-optic shading band device is configured to communicate with said processor.

6. The apparatus of claim 1, wherein:
said electro-optic shading band device is configured to communicate with said processor, said processor configured to calculate a density of said optical medium and to calculate and optimize desired signals and crosstalk, said electro-optic shading band device configured to adjust said shading band in response to said calculation of said processor.

7. The apparatus of claim 6, wherein:
said electro-optic shading band device is configured to at least one of substantially eliminate and modify said shading band in response to said calculation.

8. The apparatus of claim 1 wherein:
said electro-optic shading band device is configured to communicate with said processor, said processor configured to calculate a crosstalk signal from adjacent tracks in said optical medium, said electro-optic shading band device configured to create said shading band to minimize said crosstalk signal.

9. The apparatus of claim 1, wherein:
said calculated characteristics comprise a density of said optical medium.

10. The apparatus of claim 1, wherein:
said calculated characteristics comprise optimizations based on desired signals and crosstalk determined from said optical medium.

11. The apparatus of claim 1, wherein:
said shading band is formed by a lithographic process.

12. The apparatus of claim 1, wherein:
said electro-optic shading band device is configured to read a high-density optical medium and a low-density optical medium wherein in an activated state said shading band device substantially modifies a frequency response of said light beam received from said high-density optical medium, and in a deactivated state said shading band device minimally restricts said light beam received from said low-density medium thereby allowing for backward compatibility.

13. A method for selectively apodizing a light beam, comprising the steps of:

providing an electro-optic shading band device configured to substantially restrict portions of said light beam containing signals from a specific frequency region and a specific physical location on an optical medium;
creating, using said electro-optical shading band device, an electro-optic shading band of substantially any configuration to restrict portions of said light beam; and
adjusting said shading band of said electro-optic shading band device in response to calculated characteristics of the optical medium.

14. The method of claim 13, wherein said step of creating said electro-optic shading band includes creating said electro-optic shading band having at least one of a substantially "bowtie" shaped configuration and a substantially inverse "bowtie" shaped configuration to restrict an amount of cross talk signal distribution in a diffraction pattern of said light beam.

15. The method of claim 13, wherein:
said creating step includes:
providing a processor in communication with said electro-optic shading band device;
calculating, using said processor, a density of said optical medium;
creating said electro-optical shading band in response to said density calculation;
calculating, using said processor, a crosstalk signal of said optical medium;
calculating/optimizing desired signals; and
minimizing/optimizing said crosstalk signal in response to said density calculation
by creating said electro-optic shading band in a specific configuration and in a specific location on said electro-optic shading band device, thereby restricting a substantial amount of cross talk signal distribution arising from adjacent tracks in overall diffraction pattern.

16. The method of claim 13, wherein:
said creating step includes at least one of substantially modifying said substantially eliminating said electro-optic shading band for backward compatibility and for accommodating different media types and generations of media from different manufacturers.

17. The method of claim 13, further comprising the step of adjusting, using said electro-optic shading band device, at least one of amplitude, phase, frequency and polarization of said light beam.

18. The method of claim 13, wherein:
said calculated characteristics comprise a density of said optical medium.

19. The method of claim 13, wherein:
said calculated characteristics comprise optimizations based on desired signals and crosstalk determined from said optical medium.

20. A system using the method of claim 13.

21. An optical system for reading information encoded on at least one of a plurality of tracks located on a surface of an optical medium, said optical system comprising:
a light source configured to transmit a light beam forming a spot on a respective one of said tracks;
an electro-optic shading band device configured to form a shading band for adjustably modifying frequencies of a reflected portion of said light beam reflected from said surface; and
a detector configured to receive a modified light beam resulting from said reflected portion of said light beam being passed through said shading band.

22. The optical system of claim 21, further comprising:

a processor configured to calculate characteristics of said optical medium and to adjust said shading band of said electro-optic shading band device in response to said calculated characteristics.

23. The optical system of claim 21, wherein:

said calculated characteristics comprise a density of said optical medium.

24. The optical system of claim 21, wherein:

said calculated characteristics comprise optimizations based on desired signals and crosstalk determined from said optical medium.

25. The optical system of claim 21, wherein:

said shading band is electro-optically created in a grid pattern formed through a lithographic process.

26. The optical system of claim 21, wherein:

said electro-optic shading band device is configured to read a high-density optical medium and a low-density medium wherein in an activated state said shading band device substantially modifies a frequency response of said light beam received from said high-density optical medium, and in a deactivated state said shading band device minimally restricts said light beam received from said low-density medium thereby allowing for backward compatibility.

27. The optical system of 21, wherein:

said shading band is at least one of eliminated and reconfigured dynamically to substantially eliminate a shading effect of said shading band for a low-density optical medium which does not experience substantial adjacent crosstalk.

28. The optical system of claim 21, wherein:

said shading band device configured to form said shading band in at least one of a substantially "bowtie" shaped configuration and a substantially inverse "bowtie" configuration to selectively restrict a portion of signal distribution in a diffraction pattern of said light beam.

29. The optical system of claim 21, wherein:

said electro-optic shading band device comprises conductive coatings with a medium between said conductive coatings, said conductive coatings comprised of at least one of electrodes, electrical lead strips, circular dots, annular rings and donut-shaped patterns, said medium comprised of at least one of liquid crystal, crystal, electrooptic medium and optically active medium.

30. The optical system of claim 21, wherein:

said electro-optic shading band device is configured to modify at least one of amplitude, phase, frequency and polarization of said reflected light beam.

31. The optical system of claim 21, wherein:

said electro-optic shading band device is configured to at least one of substantially eliminate and modify said shading band in response to said calculation.

32. The optical system of claim 21, wherein:

said electro-optic shading band device is configured to communicate with a processor, said processor configured to calculate a crosstalk signal from adjacent tracks in said optical medium, said electro-optic shading band device configured to create said shading band to minimize said crosstalk signal.

* * * * *